(12) United States Patent
Geng et al.

(10) Patent No.: US 10,893,351 B1
(45) Date of Patent: Jan. 12, 2021

(54) HEADPHONE CHARGING CASE

(71) Applicants: Sihua Geng, Shenzhen (CN); Zhou Yi, Dongguan (CN); Jianfei Liu, Dongguan (CN); Sen Wang, Dongguan (CN)

(72) Inventors: Sihua Geng, Shenzhen (CN); Zhou Yi, Dongguan (CN); Jianfei Liu, Dongguan (CN); Sen Wang, Dongguan (CN)

(73) Assignee: Sharetronic Data Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 16/691,185

(22) Filed: Nov. 21, 2019

(51) Int. Cl.
*H04R 1/10* (2006.01)

(52) U.S. Cl.
CPC ......... *H04R 1/1025* (2013.01); *H04R 1/1041* (2013.01); *H04R 2420/07* (2013.01)

(58) Field of Classification Search
CPC . H04R 1/1025; H04R 1/1041; H04R 2420/07
See application file for complete search history.

(56) References Cited

U.S. PATENT DOCUMENTS

| | | | |
|---|---|---|---|
| 7,272,421 | B2 | 9/2007 | Bang et al. |
| 7,925,296 | B2 | 4/2011 | Lin |
| 8,144,914 | B2 | 3/2012 | Shi |
| 8,145,283 | B2 | 3/2012 | Shi |
| 8,571,544 | B2 | 10/2013 | Pelland et al. |
| 8,655,420 | B1 | 2/2014 | Pelland et al. |
| 9,013,145 | B2 | 4/2015 | Castillo et al. |
| 9,049,502 | B2 | 6/2015 | Pelland et al. |
| 9,438,987 | B2 | 9/2016 | Koss et al. |
| 9,502,913 | B2 | 11/2016 | Takahashi et al. |
| 9,961,431 | B2 | 5/2018 | McPeak et al. |
| 9,967,649 | B2 | 5/2018 | Chandramohan et al. |
| 10,009,678 | B2 | 6/2018 | Panecki et al. |
| 10,110,984 | B2 | 10/2018 | Rich et al. |
| 10,123,104 | B1 | 11/2018 | Shao |
| 10,182,282 | B2 | 1/2019 | McPeak et al. |
| 10,225,637 | B2 | 3/2019 | Panecki et al. |
| 10,701,472 | B1 * | 6/2020 | Xu .................. H02J 7/0044 |
| 2017/0245039 | A1 * | 8/2017 | Chen .................. H01M 10/36 |
| 2017/0339482 | A1 * | 11/2017 | Schrems .............. G06F 1/1626 |
| 2018/0234756 | A1 * | 8/2018 | Linden ................ H04R 1/1033 |
| 2019/0288543 | A1 * | 9/2019 | Castillo .................. H02J 7/025 |

\* cited by examiner

*Primary Examiner* — Andrew L Sniezek
(74) *Attorney, Agent, or Firm* — Joe Nieh

(57) ABSTRACT

The invention relates to a headphone charging case comprising an earphone case with earphone holder affixed inside the earphone case, and the side of the earphone holder is relatively connected with a WIFI antenna, an RF antenna. The inside of the earphone holder is provided with an earphone, and the inside of the earphone holder is relatively inserted with a placement channel matched with the earphone. The top of the earphone holder is provided with a magnet for attracting the earphone, the lithium battery is provided inside the earphone, and the charging conductor at the bottom of the earphone is electrically connected with the lithium battery. A main board and a rechargeable battery are affixed to the earphone holder. A charging board is fixed on the main board, a pogopin charging contact is electrically connected to the charging board, a Type-C charging port is fixed on the bottom of the main board, and the top of the earphone case is connected to the upper cover with a hinge bracket.

6 Claims, 6 Drawing Sheets

HEADPHONE CHARGING CASE

BACKGROUND

Field of Invention

The present invention relates to a headphone charging case. In particular, the present invention relates to an embedded earphone charging case with wireless communication function.

Description of Related Art

Wireless Bluetooth headsets include Bluetooth headsets and infrared headsets. Bluetooth headsets use Bluetooth technology on hands-free headsets, allowing users to avoid the annoying wires and freely move about. Since the advent of the Bluetooth headset, it has been a popular product to increase the efficiency of mobile business people.

Bluetooth was originally developed by Ericsson, Nokia, IBM, Intel, Toshiba, and CEIEC. It is a communication interface for short-distance wireless transmission. The basic communication distance is about 10 meters, the transmission rate is about 721 kbps, and it operates at a frequency of 2.4 GHz. It supports one-to-many data transmission and voice communication. Since Bluetooth is not designed to carry large traffic loads, it is not a replacement for LAN or WAN.

In the existing TWS earphones, the earphone charging case only has a simple charging function, resulting in a single function, which cannot meet the increasingly wide use requirements of users.

BRIEF SUMMARY OF THE INVENTION

A headphone charging case having a wireless communication function, comprising an earphone case, wherein an earphone holder is affixed inside the earphone case, and a side of the earphone holder is connected with a WIFI antenna and a RF (radio frequency) antenna. An earphone is placed in the earphone holder. The inside of the earphone holder is provided with a placement channel that cooperates with the earphone. A magnet for attracting the earphone is disposed at the top of the earphone holder. A lithium battery is disposed inside the earphone, and the bottom of the earphone is provided with a charging conductor electrically connected to the lithium battery.

A motherboard and a rechargeable battery are affixed to the outside of the earphone holder, and a charging board is affixed on the motherboard. The charging board is electrically connected with a pogopin charging contact, and a Type-C charging port is affixed on the bottom of the motherboard. The top of the earphone case is hinged to the upper cover through a hinge bracket, and a display screen is fixed on the front portion of the earphone case.

A controller is disposed inside the earphone case, and the controller is connected to a baseband processor for generating a baseband signal. The baseband processor is connected to a radio frequency processor for transmitting the baseband signal. The controller, the Bluetooth module, the WIFI module, and the display screen are electrically connected.

An MCU is disposed inside the earphone. The MCU is connected to a Bluetooth module, and an audio power amplifier module for adjusting audio power. The audio power amplifier module is connected to a speaker for outputting audio.

A heat dissipation hole is disposed on a side wall of the earphone case opposite to the WIFI antenna and the RF antenna. A heat dissipation fan is mounted on an inner wall of the earphone case opposite to the heat dissipation hole.

Preferably, the magnet is disposed at top four corners of the earphone holder.

The earphone is placed in a placement channel inside the earphone holder, and after being affixed by the magnet, the charging conductor at the bottom of the earphone is in contact with the pogopin charging contact.

The rechargeable battery is electrically connected to the charging board and the Type-C charging port.

The radio frequency processor is connected to the radio frequency antenna. The WIFI module is connected to the WIFI antenna. In the preferred embodiment, the WIFI module uses KB3077, the Bluetooth module uses a BT-210 wireless Bluetooth module. In the preferred embodiment, the baseband processor uses Balong 5000, the RF processor uses RFM119 radio frequency transmitting module, the audio power amplifier module uses TDA2030, and the controller and the MCU uses LPC5500.

The embedded earphone charging case with wireless communication function provided by the present invention realizes communication between the earphone and the earphone case through the Bluetooth module. It integrates Bluetooth communication, WIFI communication, baseband communication, and headset charging and other functions in a small space inside the earphone case. It can access the cloud server through baseband communication, realize the control of the smart home through interaction with the Internet, and also realize the display function through the display screen, which may be used conveniently for watching video. It effectively expands the useful functions of the earphone and the headphone charging case.

DETAILED DESCRIPTION OF THE PREFERRED EMBODIMENT

The following description and figures are meant to be illustrative only and not limiting. Other embodiments of this invention will be apparent to those of ordinary skill in the art in view of this description.

Figure 1:
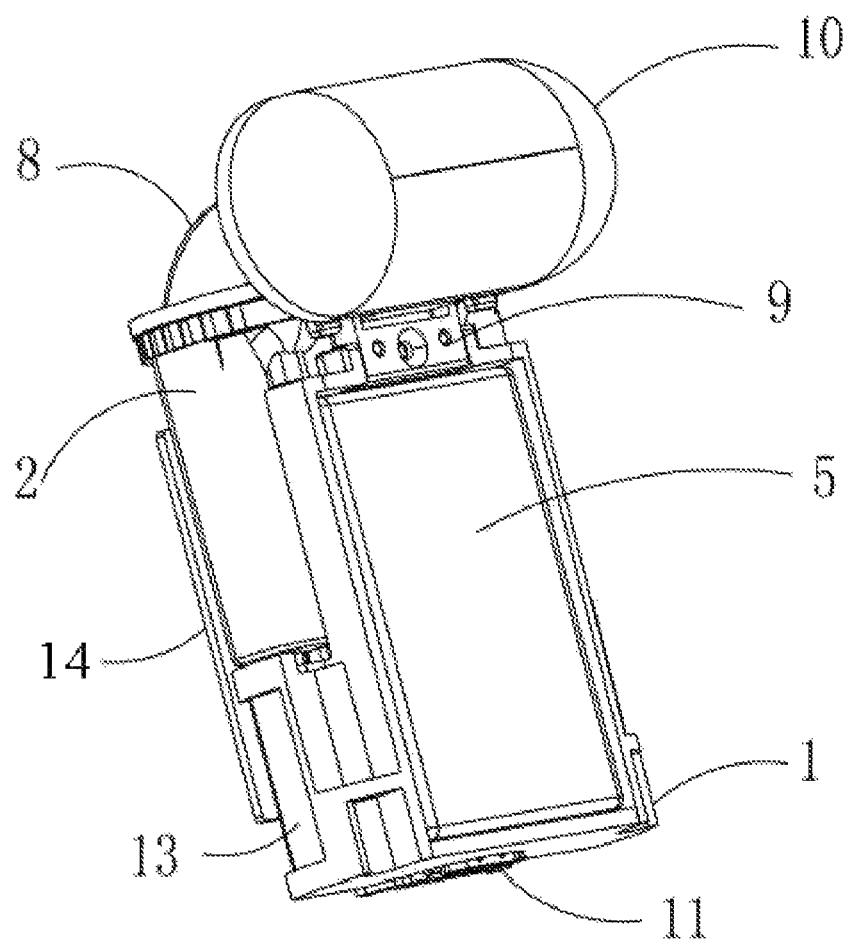
FIG. 1 shows the back structure of the preferred embodiment of the present invention.
Figure 2:
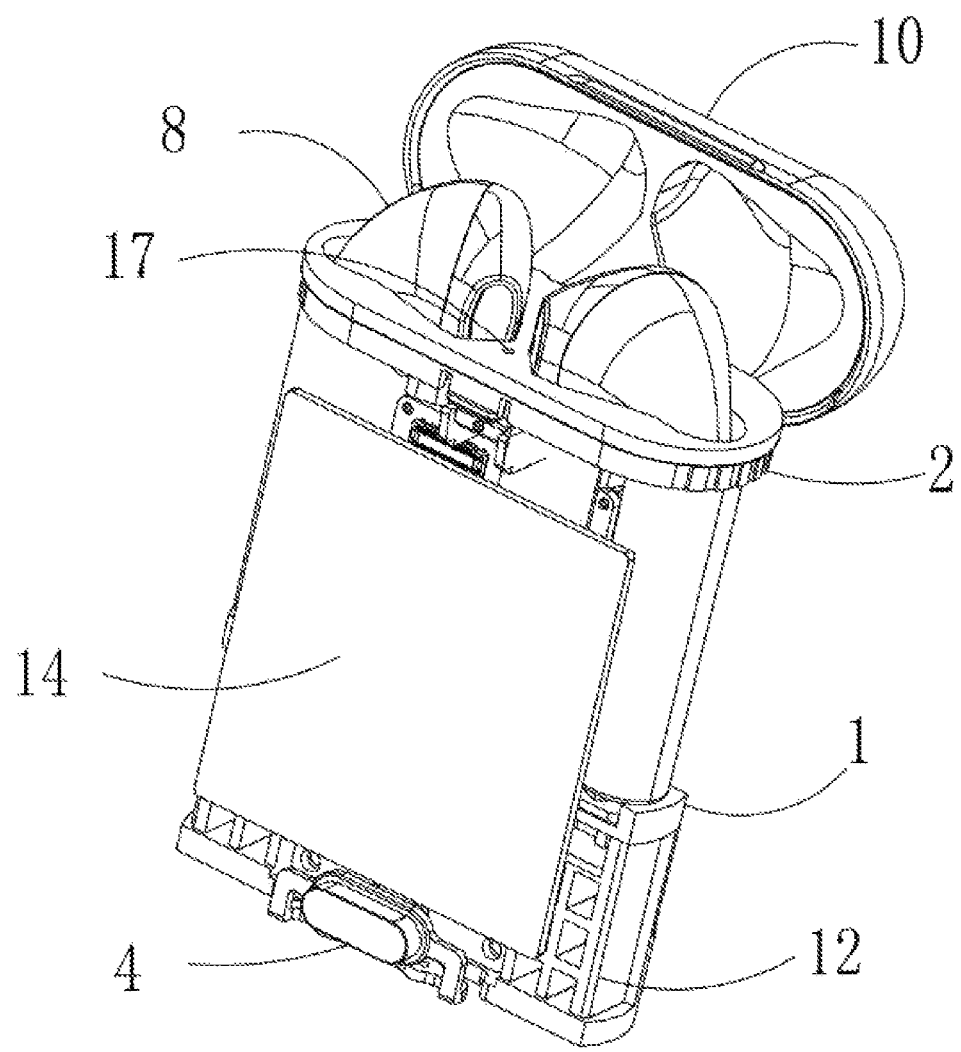
FIG. 2 shows the front structure of the preferred embodiment of the present invention.
Figure 3:
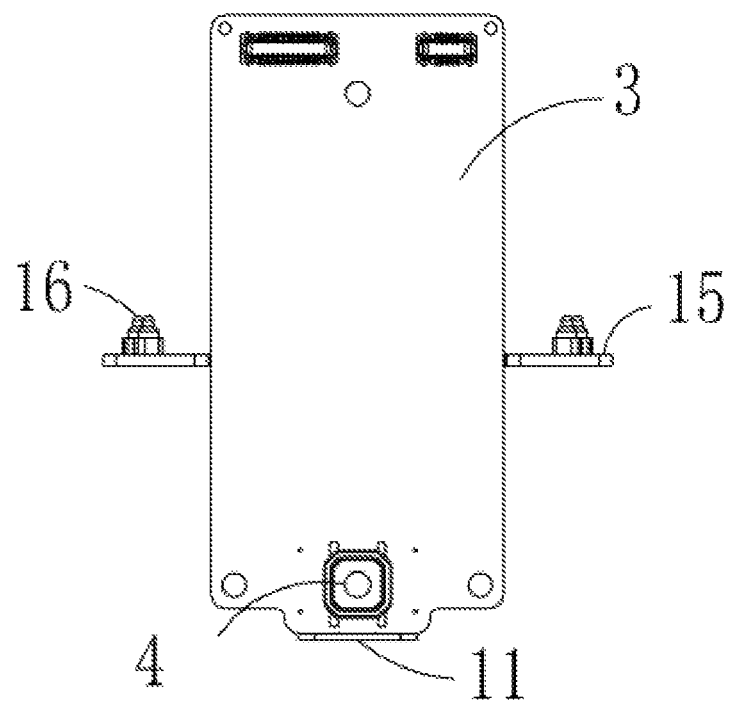
FIG. 3 shows structural view of the main board of the preferred embodiment of the present invention.
Figure 4:
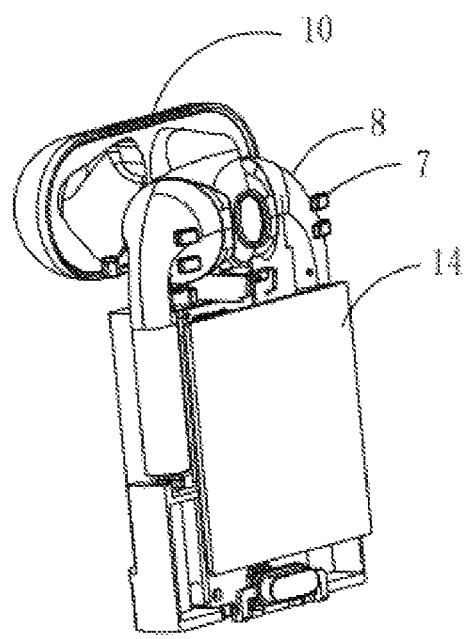
FIG. 4 shows side view of the preferred embodiment of the present invention.
Figure 5:
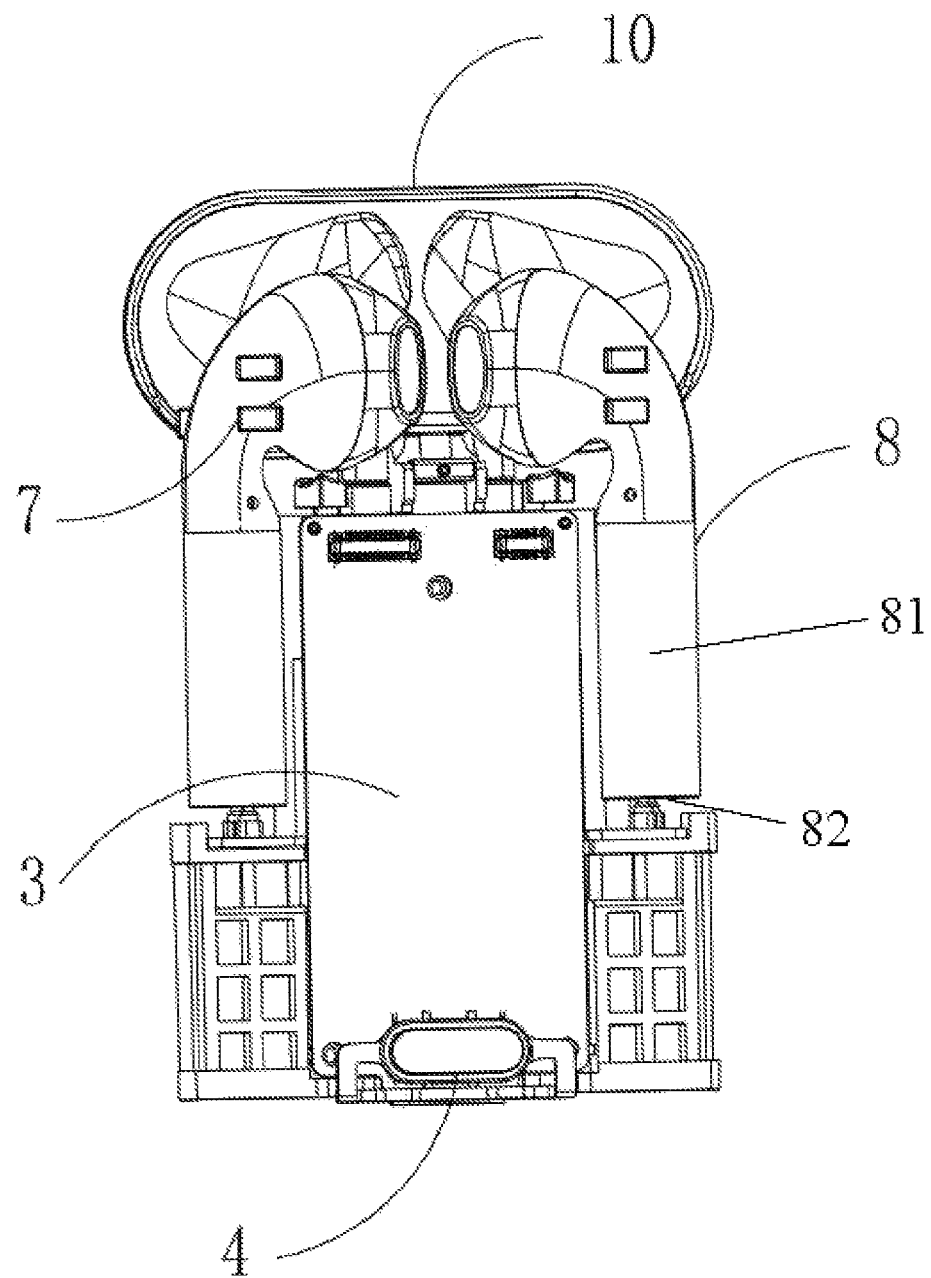
FIG. 5 shows the internal structure of the front side of the preferred embodiment of the present invention.
Figure 6:
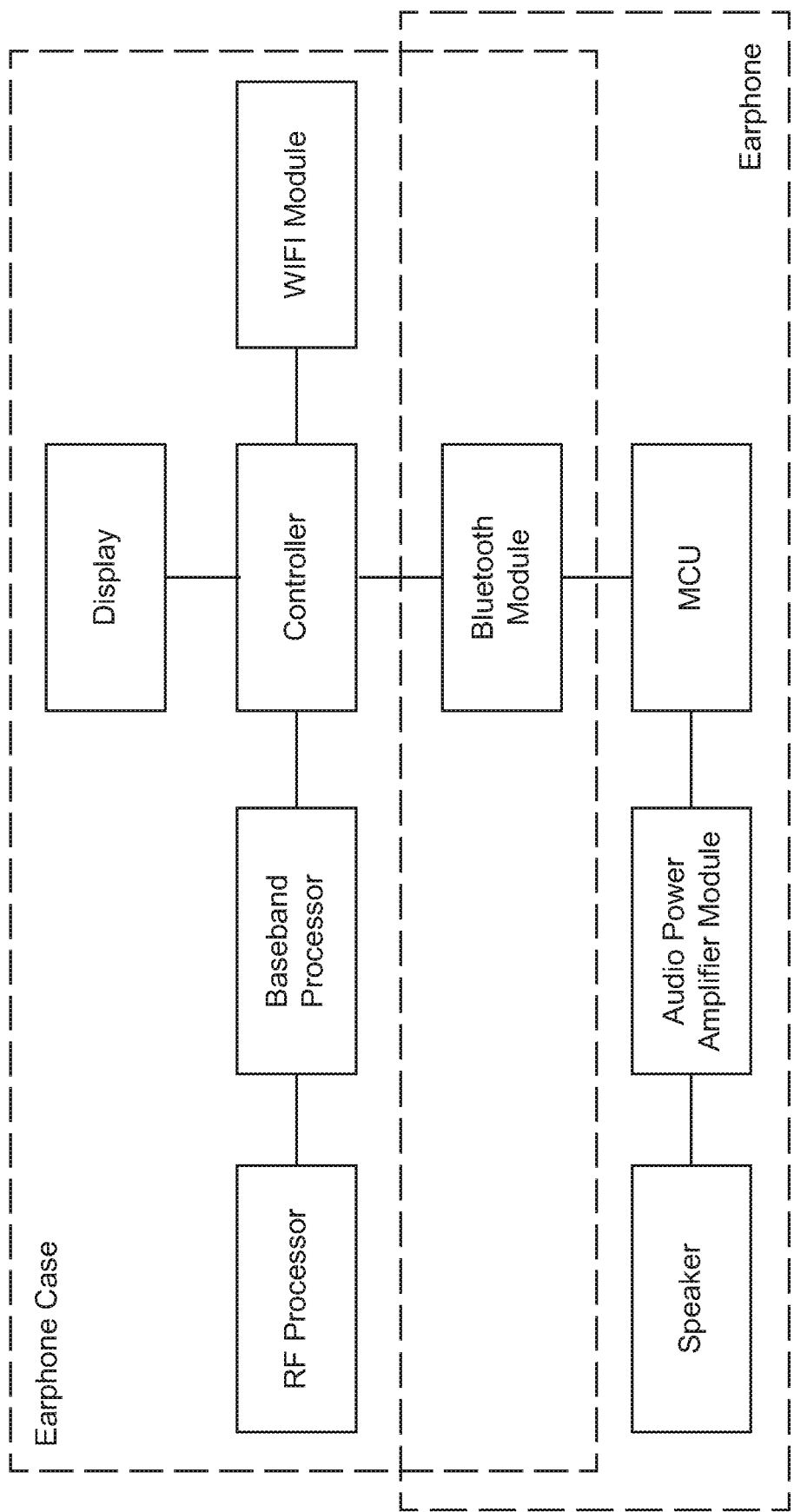
FIG. 6 shows the internal system of the earphone case and the earphone of the preferred embodiment of the present invention.

The embedded earphone charging case with wireless communication function, as shown in FIG. 1 to FIG. 6, includes an earphone case 1, and an earphone holder 2 is mounted inside the earphone case 1. A WIFI antenna 12 and the radio frequency antenna 13 are connected to the side of the earphone holder 2. An earphone 8 is disposed in the earphone holder 2. The earphone holder 2 is internally provided with a placement channel corresponding with the earphone 8. The top of the earphone holder 2 is provided with a magnet 7 for attracting the earphone 8. The earphone 8 is internally provided with a lithium battery 81 and a charging conductor 82 electrically connected to the lithium battery 81 is disposed at the bottom of the earphone 8.

A motherboard 3 and a rechargeable battery 5 are affixed to the outside of the earphone holder 2, and a charging board 15 is affixed on the main board 3. A pogopin charging contact 16 is electrically connected to the charging board 15, and a Type-C charging port 11 is affixed on the bottom of the main board 3. The top of the earphone case 1 is hinged to the upper cover 10 through the hinge bracket 9, and the display screen 14 is fixed at the front of the earphone case 1.

A controller is disposed inside the earphone case 1, and the controller is connected with a baseband processor for generating a baseband signal. The baseband processor is connected with a radio frequency processor for transmitting the baseband signal. The controller, the Bluetooth module, the WIFI module, and the display screen 14 are electrically connected.

An MCU is disposed inside the earphone 8. The MCU is connected to the Bluetooth module and an audio power amplifier module for adjusting audio power. The audio power amplifier module is connected with a speaker for outputting audio.

In the preferred embodiment, a heat dissipation hole is disposed on a side wall of the earphone case 1 opposite to the WIFI antenna 12 and the RF antenna 13. A heat dissipation fan is mounted on the inner wall of the earphone case 1 opposite to the heat dissipation hole.

Preferably, the magnet 7 is disposed at top four corners of the earphone holder 2.

The earphone 8 is placed in the placement channel inside the earphone holder 2, and after being affixed by the magnet 7, the charging conductor 82 at the bottom of the earphone 8 is in contact with the pogopin charging contact 16.

The rechargeable battery 5 is electrically connected to the charging board 15 and the Type-C charging port 11.

The RF processor is connected to the RF antenna 13. The WIFI module is connected to the WIFI antenna 12. In the preferred embodiment, the WIFI module uses KB3077, the Bluetooth module uses the BT-210 wireless Bluetooth module, the baseband processor uses the Balong 5000, the RF processor uses the RFM119 radio frequency transmission module, the audio amplifier module uses TDA2030, and the controller and MCU uses LPC5500.

The Bluetooth module in the earphone case 1 and the Bluetooth module in the earphone 8 are both BT-210 wireless Bluetooth modules, and the communication between the earphone 8 and the earphone case 1 is realized by means of the Bluetooth module. Bluetooth communication, WIFI communication, baseband communication, headset charging, and other functions are all integrated into a small space inside the earphone case 1. Cloud server access is available through baseband communication. The present invention, through interaction with the Internet, provides control of the smart home. The present invention also has display function through the display 14 for watching videos.

In addition, a microphone is provided on the earphone 8 for detecting voice and noise for noise suppressing. eSIM is provided in the earphone case 1 for telephone communication in cooperation with the earphone 8.

The earphone 8 is placed in the placement channel inside the earphone holder 2. After being affixed by the magnet 7, the charging conductor 82 at the bottom of the earphone 8 will be in contact with the pogopin charging contact 16 and the lithium battery 81 in the earphone 8 is charged by the rechargeable battery 5.

The side wall of the earphone case 1 is provided with a heat dissipation hole opposite to the WIFI antenna 12 and the RF antenna 13. A heat dissipation fan is mounted on the inner wall of the earphone case 1 opposite to the heat dissipation hole, which can effectively improve the heat dissipation performance of the earphone case 1 and prevent heat buildup in the inside of the earphone case 1.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A headphone charging case comprising:
   a headphone case wherein the top of said headphone case is attached to an upper cover with a hinge bracket,
   an earphone holder affixed in said headphone case,
   a WIFI (wireless network protocols, based on the IEEE 802.11 family of standards) antenna and a radio frequency antenna affixed in said headphone case,
   an earphone disposed inside said earphone holder,
   a magnet for attracting said earphone is disposed in a top portion of said earphone holder,
   a lithium battery disposed inside said earphone,
   a charging conductor electrically connected to said lithium battery is provided at the bottom of said earphone,
   a main board and a rechargeable battery are affixed to said earphone holder,
   a charging board affixed on the main board,
   a pogopin charging contact is electrically connected to said charging board,
   a Type-C charging port is affixed at the bottom of the main board,
   a display screen affixed at the front of said headphone case,
   a controller is provided in said headphone case wherein said controller is connected to a baseband processor for generating a baseband signal, a radio frequency processor for transmitting the baseband signal, a Bluetooth module, a WIFI (wireless network protocols, based on the IEEE 802.11 family of standards) module, and the display screen,
   the earphone is internally provided with an MCU (microcontroller unit), and the MCU (microcontroller unit) is connected to said Bluetooth module, an audio power amplifier module for adjusting audio power, wherein said audio power amplifier module is connected to a speaker for outputting audio.

2. A headphone charging case as in claim 1, wherein said magnet is disposed at top four corners of the earphone holder.

3. A headphone charging case as in claim 1, wherein said earphone is placed in a placement channel inside the earphone holder and, after the earphone is held by the magnet, the charging conductor at the bottom of the earphone is in contact with the pogopin charging contact.

4. A headphone charging case as in claim 1, wherein said rechargeable battery is electrically connected to said charging board and said Type-C charging port.

5. A headphone charging case as in claim 1, wherein said radio frequency processor is connected to said radio frequency antenna, said WIFI (wireless network protocols, based on the IEEE 802.11 family of standards) module is connected to said WIFI (wireless network protocols, based on the IEEE 802.11 family of standards) antenna.

6. A headphone charging case as in claim 1, wherein said WIFI (wireless network protocols, based on the IEEE 802.11 family of standards) module is KB3077, said Bluetooth module is BT-210 wireless Bluetooth module, said baseband processor is Balong 5000, said radio frequency processor is RFM119 radio frequency transmitting module, said audio power amplifier module is TDA2030, and said controller and said MCU (microcontroller unit) are both LPC5500.

* * * * *